US006700123B2

(12) United States Patent  
Musiel et al.

(10) Patent No.: US 6,700,123 B2  
(45) Date of Patent: Mar. 2, 2004

(54) OBJECT DETECTION APPARATUS (75) Inventors: Michael J. Musiel, Cleveland, WI (US); James R. Voigt, Cleveland, WI (US); Victor Volkov, Moscow (RU); Leonld Gaber, San Leandro, CA (US); Dmitry Naroditsky, San Francisco, CA (US); Marc Morgovsky, Foster City, CA (US)

(73) Assignee: K. W. Muth Company, Sheboygan, WI (US)

( * ) Notice: Subject to any disclaimer, the term of this patent is extended or adjusted under 35 U.S.C. 154(b) by 82 days.

(21) Appl. No.: 10/060,887

(22) Filed: Jan. 29, 2002

(65) Prior Publication Data

US 2003/0141452 A1 Jul. 31, 2003

(51) Int. Cl.[7] .............................................. H01L 31/00
(52) U.S. Cl. ...................................... 250/330; 250/333
(58) Field of Search ......................... 250/330, 214 VT,
250/333, 340, 341.1; 313/523, 524, 530, 540, 541, 542

(56) References Cited

U.S. PATENT DOCUMENTS

| | | | |
|---|---|---|---|
| 3,625,122 A | 12/1971 | Valdes | |
| 3,652,154 A | 3/1972 | Gebel | |
| 4,383,169 A | 5/1983 | Ashton | |
| 4,649,426 A | 3/1987 | Bolstad | |
| 4,937,442 A | 6/1990 | Carts, Jr. et al. | |
| 5,008,591 A | * 4/1991 | van der Velden et al. | .. 313/524 |
| 5,013,917 A | * 5/1991 | Ulich | ......................... 250/330 |
| 5,049,730 A | 9/1991 | Loveland | |
| 5,256,870 A | * 10/1993 | Raverdy et al. | ...... 250/214 VT |
| 5,276,539 A | 1/1994 | Humphrey | |
| 5,383,200 A | * 1/1995 | Barrett et al. | .................. 372/25 |
| 5,396,069 A | 3/1995 | Craig et al. | |
| 5,414,439 A | * 5/1995 | Groves et al. | .................. 345/7 |
| 5,452,089 A | * 9/1995 | Bushman | ..................... 356/364 |
| 5,504,480 A | * 4/1996 | Bourbin | ....................... 340/903 |
| 5,519,209 A | 5/1996 | Rapoport et al. | |
| 5,579,165 A | 11/1996 | Michel et al. | |
| 5,619,036 A | * 4/1997 | Salvio et al. | ............... 250/330 |
| 5,682,229 A | 10/1997 | Wangler | |
| 5,729,010 A | 3/1998 | Pinkus et al. | |
| 5,870,180 A | 2/1999 | Wangler | |
| 5,903,996 A | 5/1999 | Morley | |
| 5,962,843 A | * 10/1999 | Sinor et al. | ........... 250/214 VT |
| 6,002,207 A | * 12/1999 | Beeteson et al. | ........... 313/542 |
| 6,072,565 A | 6/2000 | Porter | |
| 6,121,612 A | * 9/2000 | Sinor et al. | ................. 250/330 |
| 6,142,637 A | 11/2000 | Cohen et al. | |
| 6,327,073 B1 | * 12/2001 | Yahav et al. | ................. 359/321 |
| 6,373,055 B1 | * 4/2002 | Kerr | .......................... 250/330 |
| 6,420,704 B1 | * 7/2002 | Berenz et al. | .............. 250/330 |
| 2002/0195547 A1 | * 12/2002 | Ostromek et al. | .... 250/214 VT |

OTHER PUBLICATIONS http://www.drev.dnd.ca/en/recherche_sauvetage/rs–02/p–0201.asp, "ALBEDOS"—An Airborne Active Imaging System web pages, pp. 1–3, printed Dec. 16, 2002.

* cited by examiner

Primary Examiner—Diego Gutierrez  
Assistant Examiner—Amy R. Cohen  
(74) Attorney, Agent, or Firm—Wells St. John P.S.

(57) ABSTRACT

An object detection apparatus including a light intensifier tube for use on an overland vehicle is described and which includes an electromagnetic radiation emitter which emits electromagnetic radiation which is reflected from an object of interest; and an electromagnetic radiation receiver which discriminately receives the reflected electromagnetic radiation at predetermined time intervals and which provides an output signal from which information regarding the object of interest may be derived.

11 Claims, 3 Drawing Sheets

OBJECT DETECTION APPARATUS

FIELD OF THE INVENTION

The present invention relates to an object detection apparatus, and more specifically to an object detection apparatus having a light intensifier tube which includes a shutter electrode, and which finds usefulness in viewing objects in environments having on the one hand, low ambient light, or on the other hand, other conditions which prohibit the timely, and effective imaging of the objects.

DESCRIPTION OF THE PRIOR ART

The prior art is replete with numerous examples of prior art image intensifying devices which have been incorporated into devices such as night vision scopes, laser range finders and other similar devices which have been used in various civilian and military applications.

As a general matter, many of these devices have included a light intensifier tube which transforms electromagnetic radiation which may, in some cases, not be visibly perceivable by the human eye, and which may be in selected wavelengths such as infrared, ultraviolet, or x-ray, and convert this same electromagnetic radiation into a visible image which then may be utilized by an observer for various applications. Yet further, these same light intensifier tubes may be designed to take ambient, visibly discernable electromagnetic radiation, and thereafter amplify it to create a visibly perceivable image which may be used by an observer to see an object of interest under poor visibility conditions.

The prior art light intensifier tubes, as a general matter, normally include a photocathode; an image intensification system; an anode and a luminescent screen. In this regard the photocathode is operable to transform the electromagnetic radiation forming the original optical image into an electronic image. The image intensifying system in these prior art devices is operable to take the electronic image, amplify it and then transfer it to the luminescent screen, where this image is then converted into a visibly discernable image which may be perceived by the operator of same. In this arrangement, electromagnetic radiation originating from the object of interest, or from another source, upon impacting the photocathode causes a resulting emission of electrons in the form of a photocurrent from the surface of same. The resulting photoelectrons formed by this process are accelerated and focused by the light intensifier tube. The focused photoelectrons bombard the luminescent screen and cause it to luminesce. In order to focus the photoelectrons to produce good useable images, the various prior art devices have utilized magnetic fields of various types, and other electrostatic-type lenses which are located between the photocathode and the anode. The aforementioned lenses are operable to collect the electrons emitted from the photocathode surface into narrow beams which reproduce on the luminescent screen in a visibly discernible image which closely replicates or corresponds to the image projected on the photocathode.

While these earlier prior art light intensifier tubes have operated with varying degrees of success, numerous shortcomings in their individual designs have detracted from their usefulness.

For example it has been observed, that the optical resolution capacity of these earlier prior art light intensifier tubes was somewhat limited by aberrations in the electronic lenses employed with same. Still further, it was observed that it was quite difficult to reduce optical aberrations to allowable ranges by changing the resulting geometry of any of the electrodes employed in these assemblies. Consequently, in the decades following the development of these aforementioned prior art devices, sophisticated second and third generation light intensifier tubes were developed which included the use of assorted fiber-optical electrodes, and microchannel plates of various designs. While these so-called multiple-stage light intensifier tubes significantly increased the brightness of any resulting image, further difficulties remained with the use of such devices for imaging objects where other competing light sources might also be in the general vicinity of the object being observed. In this regard, other bright light sources in the vicinity of the object being viewed would often cause the resulting image provided to the observer to be completely unusable. This has been known as the so-called "Bloom Effect". Various schemes and devices have been developed to reduce the bloom effect and this is shown more clearly in various prior art references such as U.S. Pat. Nos. 5,396,069 and 5,519,209 to name but a few.

As might be expected, while these various improvements have resulted in second and even third generation light intensifier tubes having improved performance characteristics, these improvements have significantly increased the difficulty in manufacturing same, and the resulting cost of the more recent light intensifier tubes when incorporated into various devices have placed them virtually out of reach for use in many industrial and other civilian applications. Consequently, their use has been confined, to a large degree, to mostly military and other law enforcement applications.

Accordingly, an object detection apparatus and accompanying light intensifier tube which achieves the benefits to be derived from the aforementioned technology, but which avoids the determents individually associated therewith, and which can be used in various civilian and other industrial applications to image objects of interest during reduced ambient lighting or other environmental conditions is the subject matter of the present invention.

SUMMARY OF THE INVENTION

A first aspect of the present invention relates to an object detection apparatus having a light intensifier tube which includes a photocathode; a luminescent screen disposed in spaced relation relative to the photocathode; a shutter electrode disposed intermediate the photocathode and the luminescent screen; and an anode located intermediate the shutter electrode and the luminescent screen.

Another aspect of the present invention relates to an object detection apparatus which includes a shutter electrode having an integral body which comprises a first cylindrical portion and a second cylindrical portion, each of the cylindrical portions having a predetermined diametral dimension, and wherein the first cylindrical portion is located adjacent the photocathode and wherein the diametral dimension of the first cylindrical portion is less than the diametral dimension of the second cylindrical portion.

Another aspect of the present invention relates to an object detection system which includes a light intensifier tube having a shutter electrode which has a first operational condition which permits electromagnetic radiation to be processed by the light intensifier tube, and a second operational condition which substantially prevents electromagnetic radiation from being processed by the light intensifier tube, and wherein the shutter electrode is placed in the first condition for a predetermined duration of time, and wherein the duration of time is adjustable.

Another aspect of the present invention relates to an object detection apparatus including a light intensifier tube which produces a visibly discernable light output from which information regarding the object of interest may be derived.

Yet a further aspect of the present invention relates to an object detection apparatus which includes a light intensifier tube having an adjustable shutter electrode, and wherein a charge couple device is provided and which is located in optical receiving relation relative to the visible light output provided by the light intensifier tube, and wherein the charge couple device produces an output signal from which information regarding the object of interest may be derived.

Another aspect of the present invention relates to an object detection apparatus which includes an operator display coupled in signal receiving relation relative to the electromagnetic radiation receiver, and which provides a visibly discernable image of the object of interest which may be viewed by the operator of the overland vehicle.

Still further, another aspect of the present invention relates to an object detection apparatus which includes a controller for simultaneously and selectively energizing an electromagnetic radiation emitter and adjustably controlling the discrimination of an electromagnetic radiation receiver.

Another aspect of the present invention relates to a sensor which is coupled in sensing relation relative to the overland vehicle and which provides information to a controller and which is utilized for adjusting the operation of the object detection apparatus.

Still another aspect of the present invention relates to an object detection apparatus which includes a sensor which is electrically coupled with a controller, and wherein the sensor provides information regarding ambient environmental conditions, and/or operational conditions of the overland vehicle and which effects the safe operation of the overland vehicle, and wherein the controller adjusts the operation of the object detection apparatus in a fashion appropriate to the sensor information.

Another aspect of the present invention relates to an object detection apparatus which includes a sensor borne by the overland vehicle and which is electrically coupled to a controller, and wherein the controller dynamically adjusts the operation of the object detection apparatus based upon information provided by the sensor.

Still a further aspect of the present invention relates to an object detection apparatus which includes an electromagnetic radiation emitter borne by the overland vehicle and which emits eye-safe electromagnetic radiation having predetermined wavelengths in a given direction toward an area of interest which is spaced a predetermined distance from the overland vehicle, and along a possible path of movement of the overland vehicle, and wherein the electromagnetic radiation emitted strikes an object located within the area of interest and is reflected back in the direction of the overland vehicle; a light intensifier tube borne by the overland vehicle and which is operable to selectively receive and amplify the reflected electromagnetic radiation emitted by the electromagnetic radiation emitter, and other electromagnetic radiation originating from other sources within the area of interest, and wherein the light intensifier tube has a first end and an opposite second end, and wherein an adjustable shutter electrode is made integral with the light intensifier tube, and further has a first operational condition which permits electromagnetic radiation to be amplified by the light intensifier tube, and a second operational condition which substantially prohibits the amplification of the electromagnetic radiation entering into the light intensifier tube, and wherein the electromagnetic radiation entering into the light intensifier tube in the first operational condition is amplified to provide a visibly discernable light output which is provided at the second end thereof; an optical filter disposed in optical filtering relation relative to the first end of the light intensifier tube, and which passes the electromagnetic radiation emitted by the electromagnetic radiation emitter, and which has the predetermined wavelength, and which are reflected from the object of interest which is located within the area of interest; a charge couple device coupled in optical receiving relation relative to the second end of the light intensifier tube and which produces an electrical output representative of the visibly discernable light output provided at the second end of the light intensifier tube; an operator display borne by the overland vehicle and which is coupled in receiving relation relative to the electrical output provided by the charge coupled device, and which produces a visibly discernable image of the object of interest within the area of interest; a controller borne by the overland vehicle and which simultaneously and selectively energizes the electromagnetic radiation emitter to produce discreet pulses of electromagnetic radiation, and further causes the shutter electrode to selectively assume the first and second operational conditions to facilitate the amplification of the reflected electromagnetic radiation originating from objects of interests located within the area of interest, and from other sources electromagnetic radiation located within the area of interest, and to simultaneously minimize the amplification of electromagnetic radiation originating from locations outside of the area of interest; and a control circuit electrically coupled with the controller and which causes the controller to adjust the distance that the area of interest is from the overland vehicle.

These and other aspects of the present invention will be discussed in further detail hereinafter.

BRIEF DESCRIPTION OF THE DRAWINGS

Preferred embodiments of the invention are described below with reference to the following accompanying drawings.

FIG. 3 is a somewhat reduced perspective view of the present invention as employed by an overland vehicle to view areas of interest in advance of the path of movement of the overland vehicle.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
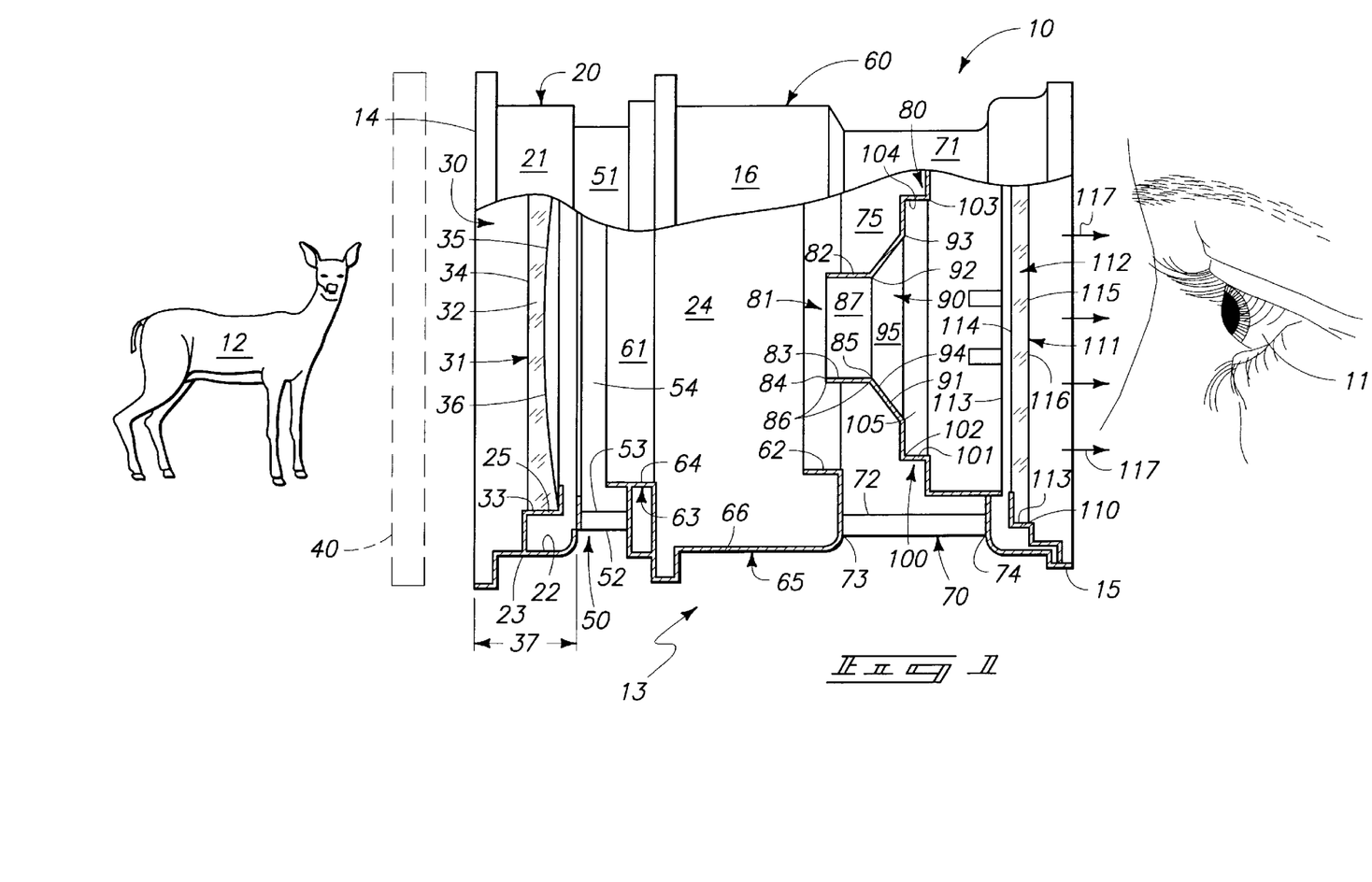
FIG. 1 is a somewhat enlarged fragmentary, longitudinal, vertical sectional view taken through a light intensifier tube which finds usefulness in the present invention.

Referring now to FIG. 1, a light intensifier tube, which is generally indicated by the numeral 10 is shown, and which finds usefulness in the present invention. As seen therein, the light intensifier tube is operable to be used by an observer 11. The observer 11 may utilize the light intensifier tube in the present object detection apparatus to see objects of interest such as the deer 12, during periods of low ambient light or under other environmental circumstances or weather conditions which would prevent or substantially impede the effective viewing of same.

The light intensifier tube 10 has a main body 13 with a first, target or object end 14; and an opposite, second, image or operator viewing end 15. The main body 13 is defined by an irregularly shaped peripheral surface having various outside diametral dimensions. The main body 13 includes a first or photocathode housing which is generally designated by the numeral 20, and which is defined by a substantially circumscribing wall 21. The wall 21 has an inside facing surface 22, and an outside facing surface 23. The inside facing surface 22 defines, in part, a longitudinally extending passageway 24 which extends between the first end 14, and the opposite second end 15. As seen in FIG. 1 a circumscribing flange 25 is located at the first end 14, and which extends substantially radially, inwardly relative to the inside facing surface 22. The circumscribing flange is operable to support a photocathode which will be discussed in greater detail hereinafter.

The first housing 20 which operates to enclose, and support, a photocathode, which will be discussed below, defines at the first end 14 of the light intensifier tube 10, an aperture 30, having a given diametral dimension and which permits electromagnetic radiation originating from various sources, (whether reflected, or otherwise) to enter the main body 13. As seen in FIG. 1, a photocathode is provided, and which is generally indicated by the numeral 31. The photocathode 31 is supported in an appropriate substantially occluding orientation relative to the aperture 30. The photocathode is utilized to receive the various wavelengths of electromagnetic radiation and permit the electromagnetic radiation to pass into the main body 13 of the light intensifier tube 10. The photocathode 31 has a main body 32 which is defined by a peripheral edge 33 and which is matingly received in, and otherwise supported on, and by, the circumscribing flange 25 which is mounted at the first end 14. The main body 32 is fabricated from an appropriate, optically transmissive substrate which allows the passage of electromagnetic radiation of the wavelengths desired therethrough. The photocathode has an exterior facing surface 34 which generally faces outwardly towards the object of interest 12 and which further is substantially planar. Moreover the photocathode has an opposite, interior facing, and concavely shaped surface 35. As seen in FIG. 1, a thin coating 36 is applied on the interior facing surface 35. The thin film coating has a thickness of about 500 to about 1,000 Angstroms and is fabricated by way of chemical vapor deposition or physical vapor deposition from $SnO_2$; or $SnO_2$ in a mixture of from about 10 percent to about 20 percent $In_2O_2$. In order to achieve the optical resolution capacity, and the other desirable characteristics of the present invention, it has been discovered that the length of the first housing 21 should be in a range of from about 1 to about 2.8 millimeters as indicated by the line labeled 37. Still further, the surface area of the concavely shaped interior facing surface 35 is selected such that it results in a minimal electrical resistance of same. This results in an increasing speed of operation of the light intensifier tube 10, in a dynamic mode of operation, as will be further discussed hereinafter. In certain applications, it may be desirable to select certain wavelength of electromagnetic radiation for processing by the light intensifier tube in order to increase its overall sensitivity. In this regard, it should be understood that certain optical filters such as indicated by numeral 40 may be provided and which are positioned adjacent the first end 14 and which selectively pass particular bands of electromagnetic radiation, such as infrared light, for the purposes which will be discussed in greater detail hereinafter.

The first housing 20 which receives or otherwise supports the photocathode 31 in an appropriate orientation is coupled or otherwise affixed to an electrically insulative spacer which is generally indicated by the numeral 50. The electrically insulative spacer has a generally annular shaped main body 51 which is defined by an outside facing surface 52; and an inside facing surface 53 which defines a passageway 54. The passageway 54 is substantially coaxially aligned with, and forms a portion of the passageway 24 which extends between the first and second ends 14 and 15 thereof. The electrically insulative spacer ensures an appropriate spacial relationship between the photocathode 31, and the adjoining shutter electrode, or assembly which will be discussed in greater detail hereinafter. The first housing 20 is coupled to the electrically insulative spacer 50 by means of metal-ceramic soldering or any other reliable fastening technique in order to sealably couple the photocathode to the electrically insulative spacer.

Referring still to FIG. 1 a shutter assembly or shutter electrode is generally indicated by the numeral 60 and which is physically coupled to the electrically insulative spacer 50 and spaced about 3 millimeters away from the photocathode 31. The shutter electrode 60 has a first end 61, and an opposite second end 62. Yet further, the earlier described passageway 24, extends substantially coaxially through the shutter electrode 60. The shutter electrode 60 has a first, substantially annular shaped portion 63 which is defined by an inside facing surface 64. The first portion has a first inside diametral dimension which is about 12.5 millimeters. Still further, the length of the first portion 63 of the shutter electrode 60 is preferably in a range of about 2 to about 6.5 millimeters. Made integral with, and substantially coaxially aligned with, the first portion 63, is a second portion 65 which is defined by an inside facing surface 66. The inside facing surface of the second portion defines an inside diametral dimension which is greater than the inside diametral dimension of the first portion 63. The shutter electrode 60 is electrically coupled with a controller and other control circuitry and which permits the shutter electrode, to alternatively assume two different operating conditions or states, that is, a first operating condition, and a second operating condition. In the first operating condition electromagnetic radiation passes through the shutter electrode 60 and along the passageway 24 where it is amplified to provide a visibly discernible light output at the second end 15. Further in the second operating condition, the shutter electrode substantially impedes the amplification of any electromagnetic radiation passing through the light intensifier tube 10. The importance of this facet of the operation of the light intensifier tube 10 and the accompanying object detection apparatus will be discussed in greater detail hereinafter. The length of the second portion 65 of the shutter electrode 60 is about 12 millimeters to about 18 millimeters. As seen in FIG. 1 the first and second portions 63 and 65 are made substantially integral one with the other.

Still referring to FIG. 1, the light intensifier tube 10, which comprises an integral portion of the object detection apparatus of the present invention, includes a second electrically insulative spacer which is generally indicated by the numeral 70, and which is disposed in substantially coaxial alignment relative to the shutter electrode 60. As seen, the second electrically insulative spacer 70 is substantially annularly shaped and is physically coupled to the second portion 65. In this regard, the second electrically insulative spacer 70 has an outside peripheral surface 71, and an opposite inside facing surface 72 which has a given inside diametral dimension. Yet further, the second electrically insulative spacer has a first end 73 which is suitably coupled, by an appropriate fastening technique, to the second portion 65; and an opposite second end 74 which is spaced therefrom. The second electrically insulative spacer 70 defines a passageway 75 which forms a portion of the passageway 24.

Referring still to FIG. 1 an anode is generally indicated by the numeral 80 and is located intermediate the shutter electrode 60 and the second end 15. In this regard the anode 80 is specially dimensioned, as will be discussed hereinafter, to provide some of the features of the present invention. In this regard the anode 80 has a first portion 81, having a main body 82 and which is substantially annular in shape. The main body 82 has an inside facing surface 83 which defines an aperture having a given inside diametral dimension. The first portion 81 has a first end 84, and a second end 85. Yet further, the main body 82 has a length dimension indicated by the line labeled 86 of about 4.85 millimeters. A passageway 87 is defined by the inside facing surface 83 and is substantially coaxially aligned with the passageway 24.

As seen in FIG. 1, the anode 80 has a second portion 90 having a main body 91. The main body has a first end 92 forming an aperture having an inside diametral dimension substantially identical to the inside diameteral dimension as defined by the first portion 81. Yet further, the main body 91 has a second end 93 which has a second diameteral dimension which is greater than the first end. The main body 91 therefore has a substantially frusto-conical shape. The main body 91 has an inside facing surface 94 which defines a passageway 95 which is substantially coaxially aligned with the passageway 24. The anode 80 also includes a third portion which is generally indicated by the numeral 100. The third portion has a main body 101 having opposite first and second ends 102 and 103, respectively. As seen, the main body 101 has an inside facing surface 104 which defines an inside diameteral dimension. The inside facing surface 104 defines a passageway 105 which is substantially coaxially aligned with the passageway 24. The inside diameteral dimension of the third portion of the anode 80 is about 22.26 millimeters. The anode 80 and the specific spacial relationships between the diameters and the lengths of the individual portions are selected so as to make it possible for the light intensifier tube 10 to achieve an optical resolution of about 50 to 75 lines per millimeter when the object detection apparatus of the present invention is operating in a pulsed mode of operation. In particular, the aforementioned optical resolution of the light intensifier tube 10 along with the minimal capacitance of the shutter electrode 60 and the accompanying photocathode 31 causes the cycling time between the first and second operating conditions of the shutter electrode to be decreased to periods of time as little as 5 nanoseconds.

Referring still to FIG. 1, a circumscribing flange 110 is provided at the second end 15 and which defines an aperture having a given a diameteral dimension. The circumscribing flange supports a luminescent screen which is generally indicated by the numeral 111, and which further substantially occludes the aperture. The luminescent screen 111 is fabricated from an optically transmissive substrate 112 which is defined by a peripheral edge 113. The peripheral edge 113 rests in mating relation relative to the circumscribing flange 110. Yet further, the optically transmissive substrate 112 has a first inside facing surface 114, and a second outside facing surface 115. A luminescent coating 116 is deposited using techniques well known in the art on the outside facing surface. It should be understood, that the light intensifier tube 10 is operable, when placed in the first operating condition, to amplify electromagnetic radiation entering at the first end 14 and provide a visibly discernable light output 117 which will then be utilized in the object detection apparatus as will be described hereinafter.

Figure 2:
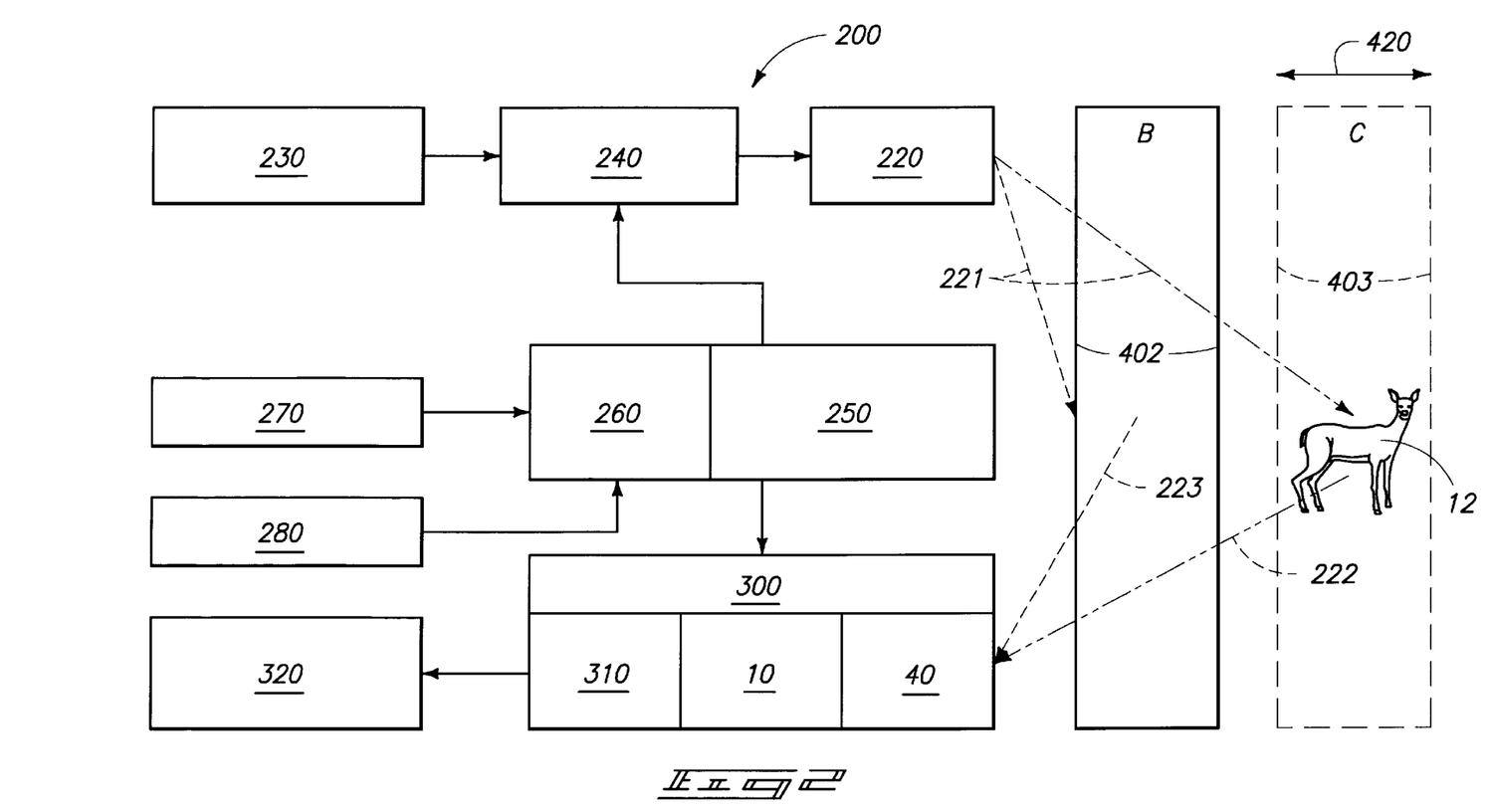
FIG. 2 is a somewhat simplified schematic diagram of the object detection apparatus of the present invention and which is being utilized to image a deer which is located some distance from the invention.
Figure 4:
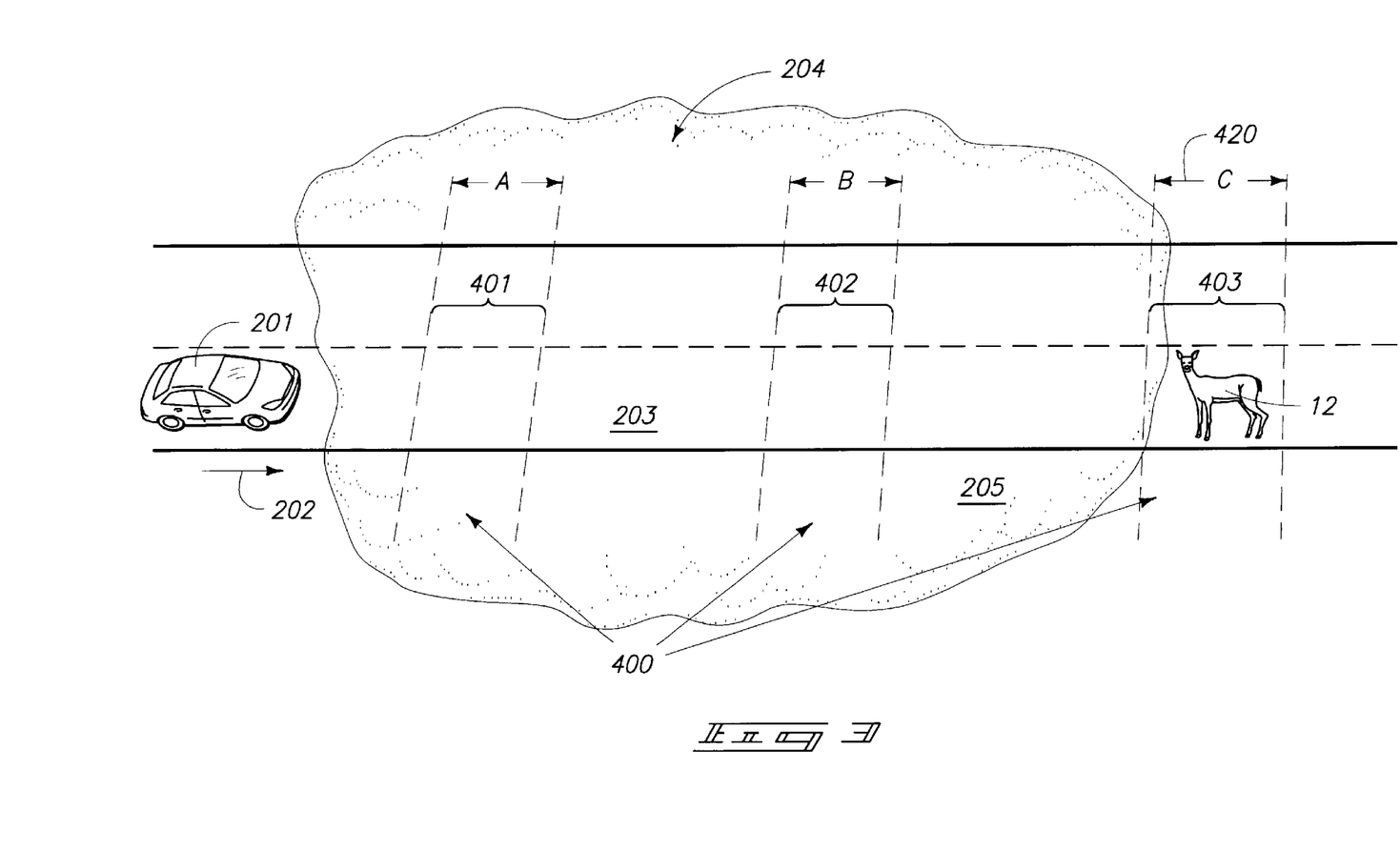

Referring now to FIG. 2, it will be seen that the object detection apparatus of the present invention is generally indicated by the numeral 200. The present object detection apparatus employs the earlier described light intensifier tube 10. The object detection apparatus is shown herein as it would be utilized in connection with an overland vehicle 201 as seen in FIG. 3, and which is moving in a direction of travel 202 along a conventional roadway 203. As will be seen in FIG. 3, and as briefly discussed above, the object detection apparatus 200 of the present invention and which is used on the overland vehicle 201 is operable to image objects of interest, such as the deer 12 which is standing upon the roadway 203. As seen in FIG. 3, the operator of the overland vehicle 201 cannot visibly discern the deer 12 in view of an intervening ambient environment condition such as rain, fog, snow, or dust, 205 which obscures the vision of the operator. Yet further, the intervening ambient environmental condition might be darkness or any other condition which may impair the visible discernment of the operator or otherwise restrict the operators vision to a distance less than what may be provided by the headlights of the overland vehicle during regular unrestricted operating conditions. It should be understood, therefore, as seen in FIG. 3, the operator of the overland vehicle 201 cannot visibly discern the deer 12 which is standing in the path of travel of same as he moves along the roadway 203. As will be appreciated, and depending upon the speed of the overland vehicle, the location of the deer on the roadway 203 may present a hazard to the safe operation of the overland vehicle because the deer 12 is located at a distance within which the operator cannot safely stop the overland vehicle 201 in the event that the deer does not move off the roadway. As should be understood, the object of interest 12 while shown herein as a deer, could constitute many other objects of interests such as rocks, debris, pedestrians, or any other condition which may be hazardous to the safe operation of the overland vehicle 201. It will be recognized, therefore, that one of the aspects of the present invention is to provide an object detection apparatus which allows the operator to image or otherwise see areas of interest in advance of the overland vehicle and which are not visibly discernable to the unaided human eye.

The object detection apparatus 200 as described herein and which is operable for use on the overland vehicle 201 includes, an electromagnetic radiation emitter 220 which is borne by the overland vehicle 201 and which emits electromagnetic radiation 221 having a given frequency. This electromagnetic radiation is reflected 222 from the object of interest 12. The electromagnetic radiation emitter comprises a light emitting diode or a laser diode. In some instances, the electromagnetic radiation emitter may be selected to provide electromagnetic radiation which is not visibly discernable. In other instances, and based on the end use of the device, the electromagnetic radiation emitter may emit electromagnetic radiation which is visibly discernable. When utilized on an overland vehicle 201 such as a passenger vehicle, the electromagnetic radiation emitter 220 emits infrared electromagnetic radiation 221 which is then reflected from the object of interest 222 and back generally in the direction of the overland vehicle 201. As further seen by reference to FIG. 2, some of the emitted electromagnetic radiation 221 is reflected off of other objects 223 (snow, dust, fog) or from locations intermediate the object of interest 12, and the object detection apparatus 200. It is this intermediate reflection from other objects such as snow flakes, rain or fog which impedes the operators effective discernment of the object of interest 12. The electromagnetic radiation emitter 220, as discussed above, is energized by a power supply which is generally indicated by the numeral 230. The power supply is of conventional design and further discussion of same is not warranted. Yet further, the power supply is coupled to an emitter driver assembly such as an infrared diode driver 240. The driver assembly 240 is responsive to the commands of a controller to cause the emitter to emit pulsed electromagnetic radiation. These pulses may be periodic, staggered, random, or incremental depending upon the use of the present apparatus 200. For example, the electromagnetic radiation emitter may be caused to pulse electromagnetic radiation 221 having a duration of less than about 400 nanoseconds. Still further, the emitted pulses of electromagnetic radiation 221 may have a duration of about 1 nanosecond to about 400 nanoseconds at timed intervals of less than about 10 kilohertz. Moreover, the predetermined duration and predetermined time intervals are selected to result in an optimal signal to noise ratio of the resulting output signal 117 as provided by the light intensifier tube 10.

As seen in FIG. 2, the object detection apparatus 200 is provided with a controller which is generally indicated by the numeral 250 and which is operable to simultaneously and selectively energize the electromagnetic radiation emitter 220, and adjustably control the discrimination of the electromagnetic radiation receiver or light intensifier tube 10 as provided for hereinafter. It should be understood that the controller 250, is operable to cause the pulsing of the electromagnetic radiation emitter 220 and timely cause the shutter electrode 60 to alternatively assume the first or second operational conditions in order to effectively process electromagnetic radiation reflected from the object of interest 12, and provide an output signal 117 which may be utilized by the observer 11. In this regard, the controller is operable to controllably coordinate the pulsing of the electromagnetic radiation emitter and the operation of the shutter electrode 60 such that, on the one hand the operator 11 can gather information regarding objects 12 at varying distances and in areas of interest which are spaced from the overland vehicle, while simultaneously limiting the collection of electromagnetic radiation 223 coming from locations other than the area of interest. This facet of the invention will be discussed in greater detail below. As will be understood however, the controller 250 is operable to energize the electromagnetic radiation emitter to emit electromagnetic radiation which travels from the overland vehicle 201 to the object of interest 12 and which is then reflected 222 and returned to the overland vehicle 201. Depending upon where the object of interest is 12 relative to the overland vehicle, the time of flight, that is the elapsed time from emission to receipt of the electromagnetic radiation 222 is calculated in advance by the controller such that the reflected electromagnetic radiation 222 returns to the overland vehicle at or about the time that the shutter electrode 60 is caused to assume the first operational condition. As earlier discussed, in this condition, the reflected electromagnetic radiation 222 is amplified by the light intensifier tube 10. To minimize the receipt of electromagnetic radiation from other locations 223 the controller 250 is operable to quickly move or switch the shutter electrode 60 between the first and second operating conditions such that the light intensifier tube 10 minimizes the collection and amplification of electromagnetic radiation 223 coming from locations other than from the immediate vicinity or area of interest where the object 12 is located.

Still referring to FIG. 2, the object detection apparatus 200 includes control circuitry 260 which is electrically coupled to the controller 250, and which provides a means by which an operator 11 of the overland vehicle 201 may influence the operation of the object detection apparatus 200. The control circuitry as seen in FIG. 2 may provide, in one form of the invention, a vehicle sensor 270 which provides information regarding ambient environmental conditions 205, and/or other operational conditions of the overland vehicle 201 which effects the safe operation of same. In response to the sensor information, the control circuit 260 thereafter adjusts the operation of the controller 250 to cause the object detection apparatus 200 to perform in a fashion appropriate for the condition being sensed. For example, the sensor 270 borne by the overland vehicle 201 may be utilized to detect ambient environmental conditions 205 such as darkness, reduced visibility due to weather conditions, such as fog, rain, snow, dust, etc. Other sensed conditions may include the relative speed of the overland vehicle, or changing driving conditions such as icy surfaces, which cause a lack of traction, or the like, and which could increase the safe stopping distance of the overland vehicle 201. Yet further, operator controls 280 are provided, and which allow the operator of the overland vehicle 201 to selectively influence the operation of the apparatus 200 as will be described below. The vehicle sensor, and the operator controls 280 are operable such that the object detection apparatus 200 may work substantially without operator attention, or may in the alternative, be disabled by the operator and then selectively operated in a given mode based on an operator's preferences.

As seen in FIG. 2, the object detection apparatus 200 includes a combined power supply and driver assembly which is generally indicated by the numeral 300 and which is responsive to the controller 250. As earlier discussed, and based upon the control circuitry 260, the power supply and driver 300 are operable to cause the shutter electrode 60 and which is made integral with the light intensifier tube 10, to alternatively assume or be rapidly switched between the first and second operational conditions as described earlier. As earlier discussed, the light intensifier tube 10 includes a visibly discernable light output 117. As seen in FIG. 2, a charge couple device (CCD) 310 is coupled in optically receiving relation relative to the output light 117 of the light intensifier tube 10. As should be understood, the charge coupled device 310 is operable to receive the visibly discernable light output 117 and convert it into an electrical output which is compatible with an operators display 320 which is mounted within the overland vehicle 201. The operators display 320 may be of any conventional design and which will provide a visibly discernible output which may be viewed by the operator of the overland vehicle 201 to display objects of interest as will be discussed below.

Referring now to FIG. 3 and as was discussed briefly above, operators of overland vehicles 201 may encounter, various environmental 204 or other ambient lighting conditions which prohibit the operator from visibly discerning a hazard 12 which under normal circumstances would be readily visibly discernable. The present object detection apparatus 200 is operable to allow the operator 11 to select specific areas of interest 400 such as what is shown in FIG. 3, and which may constitute a first area 401 labeled "A", a second area 402 labeled "B", and a third area 403 labeled "C". In this regard, it should be understood that the apparatus 200 is operable to selectively image discrete individual selected areas (A, B or C) to the substantial exclusion of other areas which may be beyond the area being viewed, or which is intermediate the overland vehicle and the area of interest. For example, the apparatus, of the present invention 200 can be rendered operable to view the third area of interest "C" where the object of interest, that being the deer 12, may be seen in the operator display 320 even though the operator of the overland vehicle 201 cannot visibly discern the deer through the intervening fog or snow 205. In this regard, the apparatus 200 is designed to amplify the reflected radiation 222 coming from the area of interest "C" (FIG. 2) and substantially to not amplify the light coming from an intermediate area "B" 223 such that the object of interest 12 may be visibly discerned on the operator display 320. Such is achieved by means of the rapid switching of the shutter electrode 60 in combination with the predetermined pulsing of the light emitter 220 as controlled by the controller 250.

As earlier noted, the object detection apparatus 200 provides operator controls 280 which allows the operator to select the depth dimension 420 of the area of interest (A, B or C) to be viewed. For example, the area of interest 400 that may be viewed in front of the overland vehicle 201 may have a depth dimension of anywhere between 0 to less than about 400 meters. Still further, the given area of interest 400 may be located anywhere in a range from about 0 to about 600 meters ahead of the overland vehicle 201. Based upon operator preferences, as provided through the operator controls 280, and further in view of information provided by the vehicle sensor 270, the respective areas of interest 400 may be adjusted to provide a safe operating environment for the operator of the overland vehicle 201. For example, under extremely difficult driving conditions and/or under slow speed vehicle operation, the operator of the overland vehicle 201 may only have to view a short distance in front of his overland vehicle 201 in order to safely operate same. Such might be the case when the operator is viewing only the area of interest "A" as shown in FIG. 3. However, as the overland vehicle 201 increases in speed, the safe stopping distance of the overland vehicle increases significantly. Consequently, the second area of interest 402 may be more appropriate for the operator to view during this transition in speed. In each instance, areas of interest A and B cannot be visibly discerned by the operator. In this example, the object detection apparatus 200 is operable to be influenced either by the operator of the overland vehicle 201, or automatically by means of a vehicle sensor 270 which is operable to sense an increase in speed of the overland vehicle and which provides sensor information which causes the control circuitry 260 to adjust the controller 250. In this scenario, the area of interest is moved to greater distances away from the overland vehicle with increasing speed. Yet further, the present apparatus 200 is also operable automatically, with a decrease in speed, to cause the area of interest 400 to be moved to closer distances relative to the overland vehicle 201.

As will be recognized, the object detection apparatus operates, in one mode, dynamically to move and change the area of interest 400 which may be viewed by the operator of the overland vehicle 201 based upon an operating condition of the overland vehicle or changing environmental conditions. For example, if the operator 11 of the overland vehicle 201 is operating on a snow covered surface and the vehicle begins to experience a loss of traction, the stopping distance of the overland vehicle 201 of course, greatly increases. Consequently, the operator of the overland vehicle 201 would need to view areas of interest at greater distances away from the overland vehicle in order to provide sufficient reaction time to stop the overland vehicle in the event that an obstacle or obstruction such as the object of interest 12 presents itself in the path of movement 202 of the overland vehicle. Still further, the vehicle sensor 270 may comprise all manner of assorted sensors such as temperature, traction, speed, visibility, wet ball, humidity, and any other sensor which might effect the safe operation of the overland vehicle 201. In one mode of operation, the object detection apparatus 200 can be operated in a static mode, that is, to override the dynamic movement of the areas of interest 400. Still further, it should be understood that the object detection apparatus 200 is operable, for example, when the overland vehicle 201 is increasing speed to cause the control circuit 260 to both increase the size or depth 420 of the area of interest 400, and to further move the area of interest 400 a greater distance away from the overland vehicle 201. As will be recognized, the control circuit 260 is operable to dynamically adjust the area of interest 400 based upon sensor information 270 and operator input 280 to provide a means to selectively tailor the area of interest 400 which provides the safest operation for the overland vehicle 201 under operating conditions which would prohibit the operator of the overland vehicle 201 from perceiving hazards or other objects of interest 12 which may be in the path 202 of the overland vehicle 201.

Operation

The operation of the described embodiments of the present invention are believed to be readily apparent and are briefly summarized at this point. As seen in FIGS. 1 and 2, an object detection apparatus 200 is provided for use on an overland vehicle 201 and which includes an electromagnetic radiation emitter 220 which emits electromagnetic radiation 221 which is reflected from an object of interest 12. An electromagnetic radiation receiver 10 is provided and which discriminately receives the reflected electromagnetic radiation at predetermined time intervals and which provides an output signal 117 from which information regarding the object of interest 12 may be derived. As earlier discussed, the object detection apparatus 200 emits pulses of electromagnetic radiation 221 having a predetermined duration at predetermined time intervals which result in an optimal signal to noise ratio in the resulting output signal 117. As noted above, the electromagnetic radiation receiver comprises a light intensifier tube 10 having an adjustable shutter electrode 60. Still further, the light intensifier tube 10 produces a visibly discernable light output 117, and the object detection apparatus 200 further includes a charge couple device 310 which is oriented in optical receiving relation relative to the visibly discernable light output 117 of the light intensifier tube 10. The charge couple device 310 produces an output signal from which information regarding the object of interest 12 may be derived and which is displayed on an operator display 320. The object detection apparatus 200 further includes a controller 250 for adjustably controlling the synchronous operation of the electromagnetic radiation emitter 220 and the electromagnetic radiation receiver or light intensifier tube 10. Yet further, the object detection apparatus 200 may include a sensor 270 which is coupled in sensing relation relative to the overland vehicle 201, and which provides information to the controller 250 for adjusting the operation of the object detection apparatus 200. As noted earlier, the controller 250 adjustably and synchronously controls the electromagnetic radiation emitter 220 by selectively energizing the electromagnetic radiation emitter 220 for a duration of time at predetermined time intervals and substantially simultaneously controlling the discrimination of the electromagnetic radiation receiver 10 by way of causing the shutter electrode 60 to switch rapidly between the first operating condition, and the second operating condition. As discussed above, the first operating condition causes the light intensifier tube to amplify electromagnetic radiation 222, 223 received by the light intensifier tube 10, and in the second operating condition, the light intensifier tube 10 does not amplify any received electromagnetic radiation.

A control circuit 260 is provided for the object detection apparatus 200 and which may be under the influence of the operator and which permits the operator to gather information regarding objects of interest at varying distances from the overland vehicle. The object detection apparatus 200 is operable to receive, when operable, reflected electromagnetic radiation 222 from objects of interest 12 within an area of interest 400 and to substantially simultaneously limit the amplification of electromagnetic radiation originating from other locations 223. The control circuit 260 is operable to be responsive to vehicle sensors 270 and operator control signals 280 to adjust the operation of the device to provide for safe operation of the overland vehicle 201 during operating conditions. The present light intensifier tube 10 in combination with the object detection apparatus 200 has numerous other advantages over the prior art techniques and teachings including the substantial minimization of any "Bloom Effect" that may result from other reflected or other direct light sources which may be located within the desired area of interest 400. Still further, the simplicity of construction of the light intensifier tube 10 renders the present object detection apparatus 200 useful for various applications such as for use on a passenger vehicles and thus increases safety of operating these same vehicles during limited visibility, or other treacherous driving conditions.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An object detection apparatus for an overland vehicle, comprising:

an electromagnetic radiation emitter borne by the overland vehicle and which emits electromagnetic radiation which is directed towards and reflected from an object which is located within an area of interest which has depth dimension of less than about 400 meters and which is located at a distance from the overland vehicle which is in a range from about 0 to about 600 meters, and wherein the reflected electromagnetic radiation is reflected back generally in the direction of the overland vehicle;

an electromagnetic radiation receiver borne by the overland vehicle and which selectively collects both the reflected electromagnetic radiation which originated from the electromagnetic radiation emitter, and other electromagnetic radiation which originates from another source, and wherein both sources of electromagnetic radiation are generally directed towards the overland vehicle, and wherein the electromagnetic radiation receiver provides an output signal from which information regarding the object in the area of interest may be derived;

an operator display coupled in output signal receiving relation relative to the electromagnetic radiation receiver and which provides a visibly discernible image of the object within the area interest which is located at the distance from the overland vehicle;

a controller operably coupled with both the electromagnetic radiation emitter and receiver, and which controls the processing of the electromagnetic radiation by the electromagnetic radiation receiver and which is reflected from the object which is located within the area of interest, or which originates from another source of electromagnetic radiation within the area of interest, and which further minimizes the processing of electromagnetic radiation coming from locations other than the area of interest: and wherein the control circuit is influenced by an operating condition of the overland vehicle; and wherein the operating condition is the operating speed of the overland vehicle, and wherein an increase in the overland speed of the overland vehicle causes the area of interest to be moved to greater distances away from the overland vehicle, and a decrease in speed causes the area of interest to be moved to closer distances relative to the overland vehicle.

2. An object detection apparatus as claimed in claim 1, and wherein an increase in the operating speed of the overland vehicle causes the area of interest to increase in size, and a decrease in the speed of the overland vehicle causes the area of interest to decrease in size.

3. An object detection apparatus as claimed in claim 1, and wherein an increase in the overland speed of the overland vehicle causes the area of interest to simultaneously increase in size, and move to greater distances away from the overland vehicle, and a decrease in speed of the overland vehicle causes a substantially simultaneous movement of the area of interest to a location closer to the overland vehicle, and a decrease in the size of the area of interest.

4. An object detection apparatus for an overland vehicle, comprising:

an electromagnetic radiation emitter borne by the overland vehicle and which emits eye safe electromagnetic radiation having Predetermined wavelengths in a given direction toward an area of interest which is spaced a predetermined distance from the overland vehicle and along a possible path of movement of the overland vehicle, and wherein the electromagnetic radiation emitted strikes an object located within the area of interest and is reflected back in the direction of the overland vehicle;

a light intensifier tube borne by the overland vehicle and which is operable to selectively receive and amplify the reflected electromagnetic radiation emitted by the electromagnetic radiation emitter, and other electromagnetic radiation originating from other sources within the area of interest, and wherein the light intensifier tube has a first end and an opposite second end, and wherein an adjustable shutter electrode is made integral with the light intensifier tube, and further has a first operational condition which permits electromagnetic radiation to be amplified by the light intensifier tube, and a second operational condition which substantially prohibits the amplification of the electromagnetic radiation entering into the light intensifier tube, and wherein electromagnetic radiation entering into the light intensifier tube is amplified to provide a visibly discernible light output which is provided at the second end thereof;

an optical filter disposed in optical filtering relation relative to the first end of the light intensifier tube and which passes the electromagnetic radiation emitted by the electromagnetic radiation emitter and which has the predetermined wavelengths and which are reflected from the object of interest which is located within the area of interest:

a charge couple device coupled in optical receiving relation relative to the second end of the light intensifier tube and which produces an electrical output representative of the visibly discernible light output provided at the second end of the light intensifier tube;

an operator display borne by the overland vehicle and which is coupled in receiving relation relative to the electrical output provided by the charge couple device, and which Produces a visibly discernible image of the object located within the area of interest;

a controller borne by the overland vehicle and which simultaneously, and selectively energizes the electromagnetic radiation emitter to produce discrete pulses of electricmagnetic radiation, and further causes the shutter electrode to selectively assume the first and second operational conditions to facilitate the amplification of the reflected electromagnetic radiation originating from objects of interest located within the area of interest, or from other sources of electromagnetic radiation located within the area of interest, and to simultaneously minimize the amplification of electromagnetic radiation originating from locations outside of the area of interest;

a control circuit electrically coupled with the controller and which causes the controller to adjust the distance that the area of interest is from the overland vehicle;

a sensor borne by the overland vehicle and electrically coupled with the control circuit, and wherein the sensor provides information regarding ambient environmental conditions and operational conditions of the overland vehicle which effects the safe operation of the overland vehicle to the control circuit, and wherein the control circuit adjusts the distance that the area of interest is from the overland vehicle based upon the sensor information, and wherein the ambient environmental conditions include darkness, reduced visibility due to weather conditions, the relative speed of the overland vehicle and/or changing driving conditions which could effect the safe operation of the overland vehicle, and wherein an increase in the speed of the overland vehicle causes the control circuit to move the area of interest to greater distances away from the overland vehicle.

5. An object detection apparatus as claimed in claim 4, and wherein an increase in the speed of the overland vehicle causes the control circuit to increase the size of the area of interest.

6. An object detection apparatus as claimed in claim 4, and wherein an increase in the speed of the overland vehicle causes the control circuit to both increase the size of the area of interest, and to further move the area of interest to greater distances away from the overland vehicle.

7. An object detection apparatus as claimed in claim 4, and wherein the control circuit dynamically adjusts the area of interest based upon the sensor information.

8. An object detection apparatus as claimed in claim 4, and wherein the control circuit is under the influence of an operator of the overland vehicle.

9. An object detection apparatus as claimed in claim 4, and wherein the control circuit cannot be influenced by an operator of the overland vehicle.

10. An object detection apparatus for use on an overland vehicle, comprising:

an electromagnetic radiation emitter borne by the overland vehicle and which emits electromagnetic radiation which is directed towards and reflected from an object of interest located at a distance from the overland vehicle and within an area of interest;

an electromagnetic radiation receiver borne by the overland vehicle and which selectively collects electromagnetic radiation which originates or is reflected from the object within the area of interest;

an operator display electrically coupled with the electromagnetic radiation receiver and which produces a visibly discernable image of the object within the area of interest;

a controller electrically coupled in controlling relation relative to the electromagnetic radiation emitter and receiver; and a control circuit electrically coupled to the controller and which is operable to adjust the location of the area of interest from the overland vehicle based upon an operating condition of the overland vehicle which effects the safe operation of the overland vehicle, and wherein an increase or a decrease in the speed of the overland vehicle causes the area of interest to be selectively moved to a distance from the overland vehicle which will facilitate the safe operation of the overland vehicle.

11. An object detection apparatus for use on an overland vehicle, comprising:

an electromagnetic emitter for emitting electromagnetic radiation which is reflected from an object within an area of interest which is located within a path of travel of the overland vehicle;

an electromagnetic receiver for selectively receiving the reflected electromagnetic radiation and providing an electrical output;

an operator display electrically coupled with the electromagnetic receiver and which produces a discernable image of the object within the area of interest a controller electrically coupled to the emitter and receiver; and a control circuit influenced by the speed of operation of the overland vehicle and which adjusts the location of the area of interest based, in part, upon the speed of operation of the overland vehicle.

* * * * *